United States Patent
Arnold et al.

(10) Patent No.: US 7,653,978 B2
(45) Date of Patent: Feb. 2, 2010

(54) METHOD FOR PROVIDING STOP-OFF ON A WORKPIECE

(75) Inventors: Don R. Arnold, Auburn, WA (US); Jeff L. Guentzel, Bellevue, WA (US); Larry D. Hefti, Auburn, WA (US); Franna S. Pitt, Auburn, WA (US); Gregory L. Ramsey, Seabeck, WA (US)

(73) Assignee: The Boeing Company, Chicago, IL (US)

( * ) Notice: Subject to any disclaimer, the term of this patent is extended or adjusted under 35 U.S.C. 154(b) by 648 days.

(21) Appl. No.: 10/884,743

(22) Filed: Jul. 2, 2004

(65) Prior Publication Data
US 2006/0000873 A1    Jan. 5, 2006

(51) Int. Cl.
*B23P 25/00* (2006.01)
*B23K 1/20* (2006.01)

(52) U.S. Cl. .......................................... 29/458; 228/118
(58) Field of Classification Search ................ 29/458, 29/421.2, 423, 424, 428; 228/118, 157, 116; 427/259, 257; 156/289; 428/41.8; 205/121
See application file for complete search history.

(56) References Cited

U.S. PATENT DOCUMENTS

| | | | | |
|---|---|---|---|---|
| 3,139,352 | A | * | 6/1964 | Coyner ...................... 427/259 |
| 3,202,588 | A | * | 8/1965 | Fromson ..................... 205/121 |
| 3,927,817 | A | * | 12/1975 | Hamilton et al. ............ 228/157 |
| 4,523,973 | A | | 6/1985 | Nelson |
| 4,624,169 | A | | 11/1986 | Nelson |
| 4,638,111 | A | | 1/1987 | Gay |
| 4,716,270 | A | | 12/1987 | Gnanamuthu et al. |
| 4,724,011 | A | | 2/1988 | Turner et al. |
| 5,147,680 | A | | 9/1992 | Slysh |
| 5,316,203 | A | | 5/1994 | Rowe et al. |
| 5,436,027 | A | | 7/1995 | Offer |
| 5,513,791 | A | | 5/1996 | Rowe et al. |
| 2003/0087201 | A1 | | 5/2003 | Wu |

FOREIGN PATENT DOCUMENTS

| | | | |
|---|---|---|---|
| EP | 0 201 312 A2 | | 11/1986 |
| EP | 0 204 567 A2 | | 12/1986 |
| EP | 1 308 538 A2 | | 5/2003 |
| JP | 10032179 | * | 2/1988 |
| JP | 2002210552 | * | 7/2002 |

OTHER PUBLICATIONS

Synrad, Inc., Applications for Synrad's $Co_2$ Laser Technology, http://www.synrad.com/newsletter/0308-2/0308-2.htm.

* cited by examiner

*Primary Examiner*—John C Hong
(74) *Attorney, Agent, or Firm*—Alston & Bird LLP

(57) ABSTRACT

A method for providing a stop-off material on a workpiece is provided, as is an associated assembly. A maskant is provided on the workpiece such that a first portion of the workpiece is exposed and a second portion of the workpiece is covered by the maskant. The stop-off is then disposed, with the maskant on the workpiece preventing the stop-off from being applied to the second portion of the workpiece. The maskant is removed from the workpiece leaving the stop-off disposed on a select portion of the workpiece. The removal of the maskant can leave the workpiece substantially free of debris. Thereafter, the workpiece can be further processed, e.g., by diffusion bonding, with the stop-off preventing diffusion bonding of part of the workpiece.

23 Claims, 3 Drawing Sheets

METHOD FOR PROVIDING STOP-OFF ON A WORKPIECE

BACKGROUND OF THE INVENTION

1) Field of the Invention

The present invention relates to selective processing of a workpiece and, more particularly, to a method of providing stop-off on select portions of the workpiece so that the workpiece can be selectively diffusion bonded or otherwise processed.

2) Description of Related Art

Stop-off generally refers to a material disposed on a workpiece for facilitating subsequent processing of select portions of the workpiece. For example, according to one conventional diffusion bonding (DB) process, stop-off is provided in a predetermined pattern between workpieces to prevent bonding of corresponding portions of the workpieces. In particular, the stop-off is typically disposed in a select pattern on a surface of a first workpiece on one or more portions of the workpiece where bonding is not desired. Thereafter, a second workpiece is positioned against the surface of the first workpiece so that the stop-off is in between the two workpieces. The workpieces are pressed together and heated to a diffusion bonding temperature so that diffusion bonds are formed where no stop-off is provided between the workpieces. In those portions where stop-off is provided, the stop-off prevents bonding from occurring. The unbonded portions of the resulting assembly can define any pattern, such as a pattern of cells that are to be expanded subsequently by a gas pressure during superplastic forming (SPF) of the workpieces.

One conventional method for applying the stop-off to the workpiece includes the use of a silk-screening device. The silk-screening device includes a flat screen or template for disposing the stop-off onto the workpiece. That is, the screen defines a perforated portion that corresponds in shape to the areas of the workpiece where the stop-off is to be applied. The other portions of the screen are impervious to the stop-off. Thus, with a first side of the screen directed toward the workpiece, stop-off is spread onto the opposite side of the screen and pushed therethrough and onto the workpiece in the desired pattern.

The conventional silk-screening method is effective for disposing the stop-off but requires the use of the silk-screening machine as well as careful operation and handling of the workpiece, e.g., to prevent the stop-off from being spread onto the clean portions of the workpiece during or after the silk-screening operation. In addition, the precision and accuracy of the conventional silk-screening method is limited. Further, periodic cleaning of the screen is generally required, e.g., between each successive operation of the device. The cleaning operation slows the overall operating speed of the device and typically requires special disposal facilities, as the stop-off can include hazardous chemicals.

According to another conventional process, a strippable mask coating can be provided on the workpiece to prevent the stop-off from being applied to select portions of the workpiece. For example, U.S. Pat. No. 5,513,791 to Rowe, et al. describes a strippable mask coating that is applied to the surface of a sheet. The mask coating is selectively removed from the surface, i.e., from the areas where bonding is not desired, and the stop-off is then applied and dried on the sheet. The remainder of the flexible mask material is then removed. Any stop-off disposed onto the flexible mask material is removed with the mask material. Thus, the method does not require precise placement of the stop-off material. However, the stripping of the strippable mask material from the sheet requires cleaning of the sheet prior to diffusion bonding in order to remove the oily residue of the mask material, e.g., using an aqueous detergent solution. If not cleaned from the sheet, the residue from the mask material can prevent proper diffusion bonding.

BRIEF SUMMARY OF THE INVENTION

An improved method of the present invention for applying stop-off on a workpiece, especially in preparation for SPF-DB or other hot sizing operations on metal sheets, creates a predetermined pattern with masking tape eliminating the need for silk screening tooling or chemical cleaners. That is, the present invention provides a method for applying a stop-off material on a workpiece using a maskant such as masking tape. The maskant can be cut to a predetermined pattern to prevent stop-off from being applied to portions of the workpiece where bonding is desired. After the stop-off is disposed, the maskant can be removed. Further, the maskant can be peeled or otherwise removed from the workpiece so that a select portion of the workpiece is exposed substantially free of debris without cleaning.

According to one embodiment of the present invention, the maskant is disposed on a first workpiece. The maskant includes a substrate and an adhesive for securing the substrate to the workpiece. For example, the maskant can include a sheet of paper with an adhesive such as latex thereon. The maskant is cut to define first and second portions, e.g., using a laser that is automatically controlled through a predetermined motion to cut the maskant according to a predetermined configuration. With the maskant disposed on the workpiece, a first portion of the workpiece is exposed and a second portion of the workpiece is covered by the maskant. The maskant can be disposed only on the second portion, or the maskant can be disposed on both portions and selectively removed from the first portion. In either case, a stop-off material such as yttrium-oxide can thereafter be disposed on the first portion of the workpiece, such as by spraying. The second portion of the maskant is then removed from the workpiece, i.e., by peeling or otherwise removing the substrate with the adhesive, so that the second portion of the workpiece is exposed substantially free of debris.

The second portion of the workpiece can be diffusion bonded, with the stop-off material on the first portion of the workpiece preventing diffusion bonding of the first portion of the workpiece. For example, the workpiece, which can be formed at least partially of titanium, can be heated, pressed against a second workpiece, and diffusion bonded thereto. Such diffusion bonding can be performed without cleaning the second portion of the workpiece after the maskant is removed. In some cases, the workpiece can also be superplastically formed. For example, the workpieces can be diffusion bonded to define one or more cells therebetween, the cells being coincident with the first portion of the first workpiece. The cells can be expanded by superplastically forming either or both workpieces.

According to another embodiment of the present invention, there is provided an assembly for diffusion bonding. The assembly includes a first workpiece defining first and second portions. The workpiece can be formed at least partially of titanium or other materials. A maskant is disposed on the workpiece such that a first portion of the workpiece is exposed and a second portion of the workpiece is covered by the maskant. For example, the maskant can be disposed only on the second portion of the workpiece, or the maskant can be disposed on the first and second portions of the workpiece with corresponding first and second portions of the maskant being adapted to be removed separately from the workpiece. The maskant can be removed from the workpiece by peeling the substrate of the maskant from the workpiece so that the adhesive of the maskant is removed from the workpiece with the substrate and the workpiece is exposed substantially free of debris. According to one aspect of the invention, the substrate of the maskant can be a sheet of paper with the adhesive disposed thereon. Further, the maskant can define a cut having a predetermined configuration to define the first and second portions of the maskant.

BRIEF DESCRIPTION OF THE SEVERAL VIEWS OF THE DRAWINGS

Figure 1:
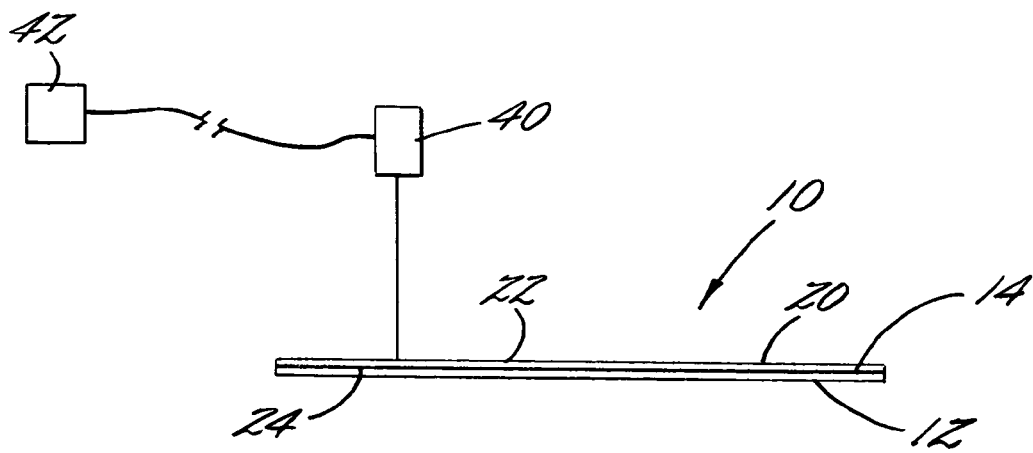
Figure 2:
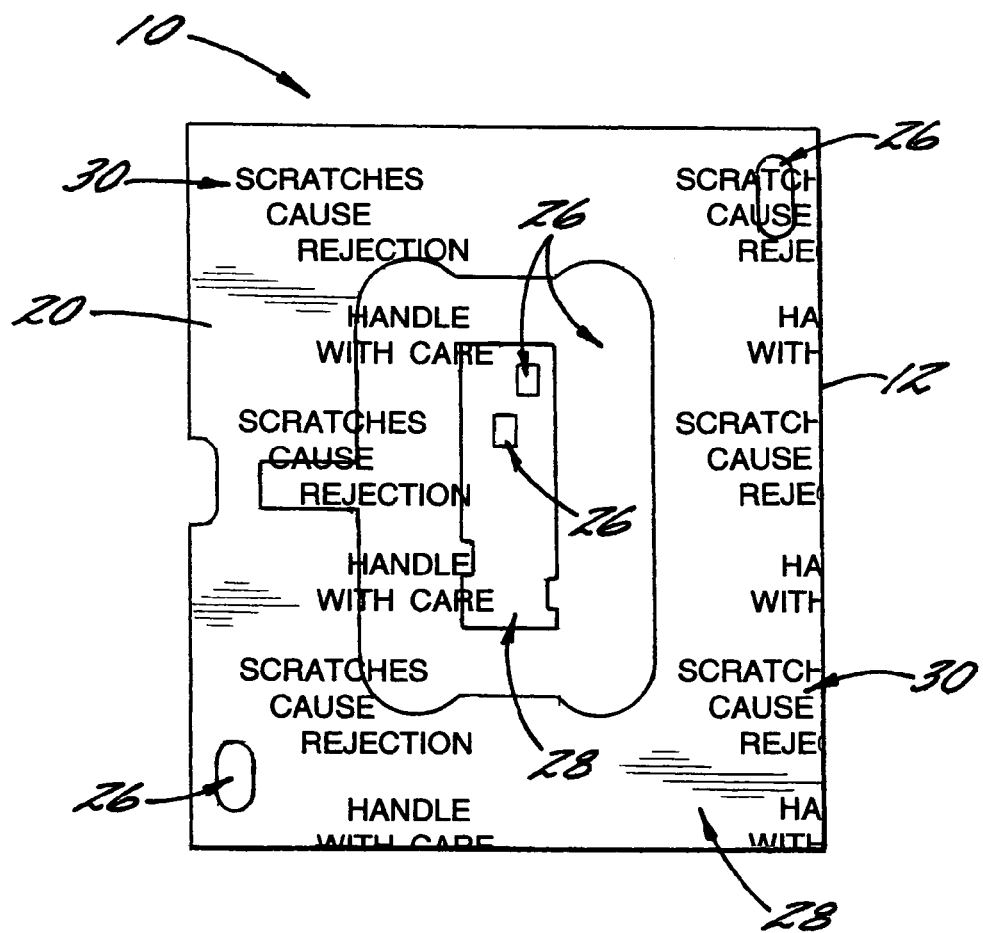
Figure 3:
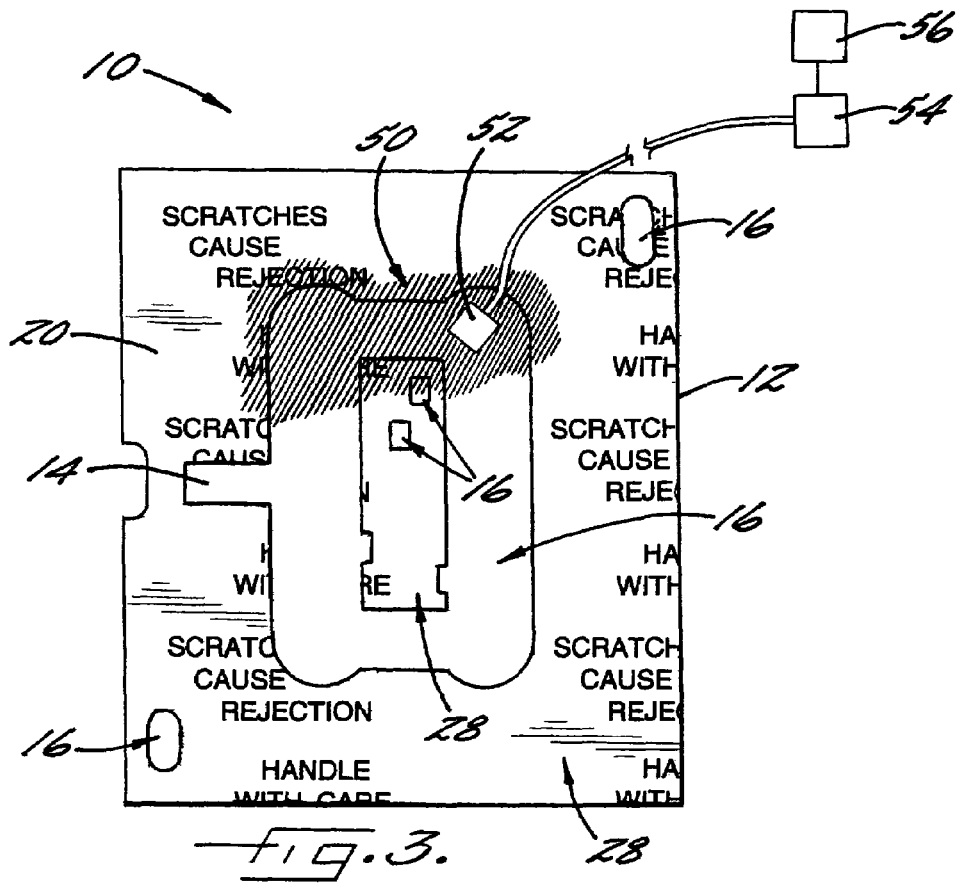
Figure 4:
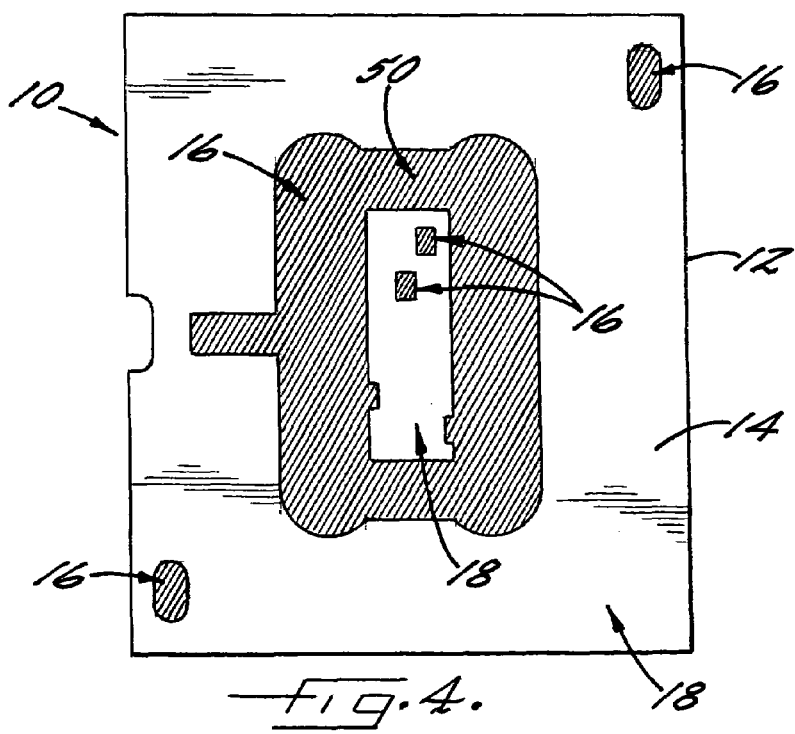
Figure 5:
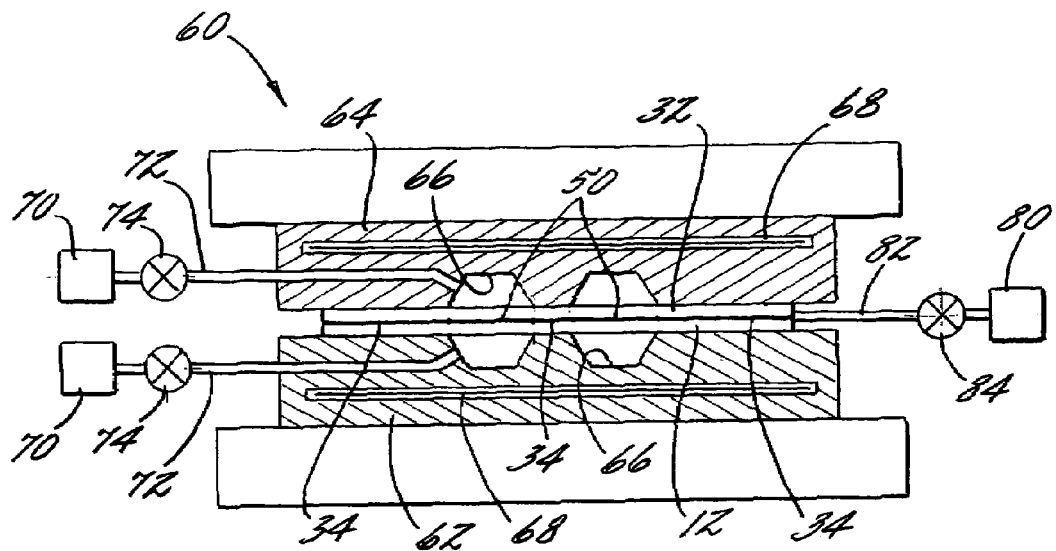
Figure 6:
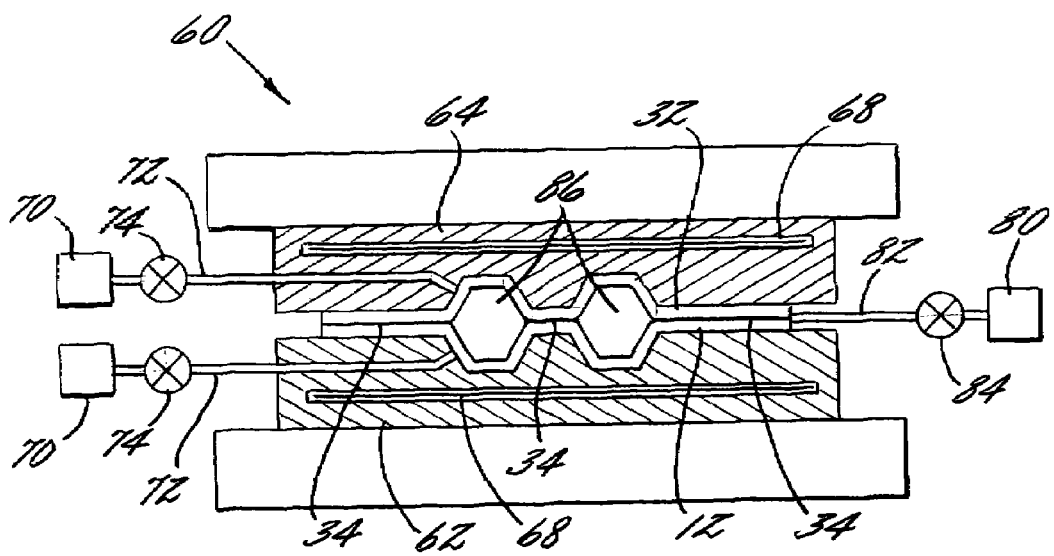

Having thus described the invention in general terms, reference will now be made to the accompanying drawings, which are not necessarily drawn to scale, and wherein:

FIG. 1 is an elevation view illustrating an assembly including a workpiece and maskant and shown with a laser configured for cutting the maskant according to one embodiment of the present invention;

FIG. 2 is a plan view illustrating the assembly of FIG. 1 after the maskant has been cut to a predetermined configuration;

FIG. 3 is a plan view illustrating the assembly of FIG. 1 after a first portion of the maskant has been removed and shown with a stop-off material partially disposed on the assembly;

FIG. 4 is a plan view illustrating the assembly of FIG. 1 after the stop-off material has been disposed and a second portion of the maskant has been removed;

FIG. 5 is a section view in elevation illustrating the assembly of FIG. 1 disposed in a die cavity for diffusion bonding and/or superplastic forming; and FIG. 6 is a section view in elevation illustrating the assembly of FIG. 1 after diffusion bonding and superplastic forming in the die cavity of FIG. 5.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and in particular to FIGS. 1 and 2, there is shown an assembly 10 according to one embodiment of the present invention. The assembly 10 includes a workpiece 12 with a maskant 20 disposed on a first surface 14 thereof. As shown in FIG. 1, the workpiece 12 can be a metallic sheet such as a sheet formed of titanium or titanium alloys. In other embodiments of the present invention, the workpiece 12 can be formed of one or more sheets, plates, blocks, tubes, angles, channels or other shapes, and the workpiece 12 can be formed of other materials. As shown in FIG. 1, the maskant 20 can be disposed over the entire first surface 14 of the workpiece 12, though in other embodiments of the present invention, the maskant 20 can be disposed on only a portion of the surface 14 or on portions of multiple surfaces of one or more workpieces of the assembly.

The maskant 20 is generally a tape that includes a substrate 22 and an adhesive 24. The substrate 22 is a sheet-like member that can be applied to and removed from the workpiece 12. Typically, the substrate 22 is formed of a material that is sufficiently durable and can be relatively inexpensive. For example, the substrate 22 can be a flexible sheet of material such as paper, plastic film, and the like. The adhesive 24 can be any of various substances that adhere the substrate 22 to the workpiece 12 and which can be removed from the workpiece 12 with the substrate 22, as described further below. The substrate 22 and the adhesive 24 can be provided together, i.e., the substrate 22 with the adhesive 24 disposed thereon can be applied together onto the workpiece 12. For example, the maskant 20 can be a sheet of latex saturated paper with an adhesive disposed on one side thereof, such as latex saturated paper marketed under the tradename PROTEX®, available from Mask-off Company, Inc. of Monrovia, Calif. Alternatively, the maskant 20 can be various other conventional tape materials, such as Scotch® masking tapes, a registered trademark of Minnesota Mining and Manufacturing Company. Further, in other embodiments of the present invention, the adhesive 24 and substrate 22 can be disposed separately onto the workpiece 12, e.g., by first disposing the adhesive 24 onto the workpiece 12 and then applying the substrate 22 to the workpiece 12. In any case, the substrate 22 can be provided with text, graphics, or other indicia 30, e.g., regarding the type of maskant 20, the recommended use of the maskant 20 or the workpiece 12, a pattern along which the maskant 20 is to be cut, other instructions or warnings, and the like.

The maskant 20 is configured to be disposed on part of the workpiece 12 and subsequently removed therefrom, e.g., as two or more portions that can be removed separately from the workpiece 12. Typically, the maskant 20 is disposed onto the workpiece 12 and subsequently cut to define the multiple portions. The maskant 20 can be cut using a variety of devices. For example, as illustrated in FIG. 1, a laser 40 or another source of radiation can be configured to direct radiation toward the maskant 20 to cut the maskant 20. A controller 42 can adjust the position and/or orientation of the laser 40 or the assembly 10 so that the laser 40 progressively cuts the maskant 20 along one or more predetermined paths corresponding to the predetermined dimensions of the portions. Alternatively, the maskant 20 can be cut using a knife or other instrument, which can be controlled automatically or manually. Typically, the laser 40 or other cutting device is controlled to prevent scoring or scratching of the workpiece 12 while the substrate 22 is being cut.

As shown in FIG. 2, the maskant 20 has been cut to define five first portions 26 and a two second portions 28, though in other embodiments of the invention, any number of first and second portions 26, 28 can be defined. The first portions 26 are removed from the workpiece 12 before a stop-off material 50 (FIG. 3) is applied to the workpiece 12, and the second portions 28 of the maskant 20 are removed after the stop-off 50 is applied. Thus, the stop-off 50 is disposed on first portions 16 of the workpiece 12, which are initially covered by the first maskant portions 26. Second portions 18 of the workpiece 12 are covered by the second portions 28 of the maskant 20 while the stop-off 50 is applied so that the second portions 18 of the workpiece 12 do not receive the stop-off 50. In other embodiments of the present invention, the maskant 20 can be disposed only on the second portions 28 of the workpiece 12 so that removal of the first portions 26 from the workpiece 12 is unnecessary.

Various types of stop-off 50 can be used, and the particular stop-off 50 material can be chosen according to the workpiece 12 and the type of processing to be performed with the workpiece 12. For example, where the workpiece 12 is to be diffusion bonded, materials such as yttrium-oxide (or yttria) or boron nitride can be used as the stop-off 50 to prevent the first portions 16 of the workpiece 12 from bonding. In particular, the stop-off material can be Dag® MS-401 SPF/DB Stop Off, a registered trademark of Acheson Industries, Inc. In addition, the stop-off 50 can be disposed by spray, brush, squeegee or other manners of application, and the stop-off 50 can be disposed as a powder, paste, slurry, film, or the like. For example, as illustrated in FIG. 3, the first portions 26 of the maskant 20 have been removed from the workpiece 12, and the stop-off 50 is being sprayed onto the workpiece 12 before removal of the second portions 28. A sprayer 52 is controlled by a controller 56 to dispose the stop-off 50 as a spray of material provided from a source 54 of the stop-off 50. The sprayer 52 can be configured to spray the stop-off 50 on select portions of the assembly 10, or the sprayer 52 can be configured to substantially cover an entire surface of the assembly 10.

After the stop-off 50 has been applied, the second portions 28 of the maskant 20 are removed from the assembly 10. Any stop-off 50 that has been disposed on the second portion 28 of the maskant 20 is removed from the workpiece 12 with the second maskant 20. The first and second portions 26, 28 of the maskant 20 can be removed by peeling or otherwise separating the maskant 20 from the workpiece 12. For example, a person or machine can grip the substrate 22 at a periphery of one of the portions 26, 28 and peel the respective portion 26, 28 away from the workpiece 12 to reveal the workpiece 12. Thus, as shown in FIG. 4, the resulting assembly 10 includes a predetermined pattern of the stop-off 50 on the surface 14, i.e., with the stop-off 50 disposed only on the first portions 16 of the workpiece 12 corresponding to the first portions 26 of the maskant 20.

Preferably, the adhesive 24 is adapted to be removed from the workpiece 12 with the substrate 22. That is, as the substrate 22 of the maskant 20 is removed from the workpiece 12, the adhesive 24 is also removed from the workpiece 12. Thus, when the maskant 20 is removed from the workpiece 12, the respective underlying portion 16, 18 of the workpiece 12 is substantially free of debris, such as oil from the adhesive 24 or substrate 22. By the term "substantially free of debris" it is meant that the workpiece 12 is sufficiently clean for a subsequent operation such as diffusion bonding. Therefore, while various maskants can be used according to the present invention, the maskant 20 should be adapted to be removed from the substrate 22 to leave the workpiece 12 substantially free of debris. For example, if the workpiece 12 is to be diffusion bonded, the adhesive 24 of the maskant 20 should be adapted to be removed from the workpiece 12 with the substrate 22 as the substrate 22 is peeled from the workpiece 12 so that the diffusion bonding is not prevented by adhesive 24, or components thereof, deposited from the maskant 20. In particular, the maskant 20 can be a sheet of PROTEX® latex saturated paper, and the maskant 20 can be removed so that at least the second portions 18 of the workpiece 12 are ready for diffusion bonding without subsequent cleaning. For example, as shown in FIG. 4, the second portions 28 of the maskant 20 have been removed from the workpiece 12 so that the workpiece 12 defines the first portions 16, which are covered with the stop-off 50, and the second portions 18, which are substantially free of debris.

After the stop-off 50 is applied to the workpiece 12, the workpiece 12 can be selectively processed. According to one embodiment of the present invention, the workpiece 12 is diffusion bonded and/or superplastically formed, with the stop-off 50 preventing diffusion bonding of select portions of the workpiece 12. In this regard, FIG. 5 illustrates an apparatus 60 that can be used to diffusion bond and/or superplastically form the workpiece 12 to a desired shape. The apparatus 60 includes two dies 62, 64 that cooperably define a die cavity 66 in which the workpiece 12 can be supported. The apparatus 60 also includes one or more heating devices 68 that are configured to heat the workpiece 12 to a processing temperature. The heating device 68 can be a gas heater, an electric resistance heater, or an electromagnetic induction heater that generates an electromagnetic field for heating the workpiece 12, e.g., via a susceptor material provided proximate to the workpiece 12. In some embodiments, the dies 62, 64 can remain relatively unheated while the workpiece 12 is heated by a susceptor in which an electrical current is induced by an induction coil, as described in U.S. Pat. No. 5,683,607 to Gillespie, et al, the entirety of which is incorporated herein by reference.

For example, the workpiece 12 can be positioned in the die cavity 66 with a second workpiece 32 so that the workpieces 12, 32 form successive layers of a stacked pack that can be selectively diffusion bonded and/or superplastically formed. The workpieces 12, 32 can be urged together, e.g., by pressurizing the die cavity 66 with a nonreactive gas such as argon from one or more fluid sources 70 via first ports 72 and valves 74. The heater 68 can heat the workpieces 12, 32 to a diffusion bonding temperature at which bonds 34 form between the first portions 16 of the workpiece 12 and the second workpiece 32. For example, for diffusion bonding of workpieces 12, 32 formed of Ti-6-4, the workpieces 12, 32 can be pressurized to about 400 psi and heated to a temperature of about 1650° F. for a period of about 120 minutes so that the bonds 34 form. In other embodiments, the workpieces can be bonded at other temperatures and pressures, e.g., at about 1400° F. or greater, and/or at about 250 psi.

The workpieces 12, 32 can optionally be superplastically formed, and superplastic forming can be performed in the same apparatus 60 as the diffusion bonding operation or in a separate apparatus. Superplastic forming generally refers to a process in which a material is subjected to conditions under which the material exhibits superplastic properties such as the capability of the material to develop unusually high tensile elongations and plastic deformation at elevated temperatures, with a reduced tendency toward necking or thinning. The characteristics of superplastic forming are further described in U.S. Pat. No. 3,927,817 to Hamilton, U.S. Pat. No. 4,361,262 to Israeli, and U.S. Pat. No. 5,214,948 to Sanders, each of which is incorporated in its entirety herein by reference, and which generally describe apparatuses in which the methods of the present invention can be performed.

As described in the foregoing patents, superplastic forming of a workpiece 12 can be performed by applying a pressure differential on opposite sides of the workpiece 12 so that the pressure exerts a sufficient force for forming the workpiece 12 against a die that defines the desired configuration of the workpiece 12. For example, as shown in FIG. 5, the dies 64, 66 define contour surfaces that correspond to a desired configuration of the workpieces 12, 32. A second port 82 fluidly connects a fluid source 80 to an area between the workpieces 12, 32, i.e., generally coincident with the first portions 16 of the workpiece 12. Thus, the fluid source 80 can provide a pressurized fluid, such as argon gas, through the port 82 and valve 84 and between the workpieces 12, 32 for superplastically forming the workpieces 12, 32 to form a space 86 (FIG. 6). For example, gas pressurized to about 300 psi can be delivered by the fluid source 80 to the area between the workpiece 12, 32. Gas between the workpieces 12, 32 and the dies 62, 64 can be vented through the first ports 72 so that the workpieces 12, 32 are urged outward by the pressure of the fluid between the workpieces 12, 32. The workpieces 12, 32 and/or the dies 62, 64 are also heated to a superplastic forming temperature, i.e., a temperature within the superplastic forming temperature range of the workpieces 12, 32, such as about 1400° F. or greater for superplastic forming titanium. When subjected to a sufficient pressure differential and heated to the superplastic forming temperature, the workpieces 12, 32 deform superplastically such that the space 86 expands and the workpieces 12, 32 are urged against the contour surface of the dies 62, 64, as shown in FIG. 6. As shown in FIGS. 5 and 6, both of the workpieces 12, 32 are superplastically formed in the apparatus 60, though a single one of the workpieces 12, 32 can instead be formed according to other embodiments of the present invention.

Thus, the workpieces 12, 32 can be diffusion bonded to define internal spaces or cells that are inflated, such as in the formation of an expanded honeycomb structure. Further, in other embodiments of the present invention, any number of the workpieces 12, 32 can be diffusion bonded and/or superplastically formed, e.g., to form multi-layer stacks of sheets that are bonded and formed to define multiple layers of inflated cells. Alternatively, in some cases, the superplastic forming can be performed prior to diffusion bonding. While exemplary temperatures and pressures for the diffusion bonding and superplastic forming operations are provided above, it is noted that the temperatures and pressures can be selected according to the material and size of the workpieces, the extent of diffusion bonding and/or superplastic forming to be performed, and the like. Also, it is noted that while pressurized fluids are used in the foregoing examples for urging the workpieces 12, 32 together for diffusion bonding and for inflating the workpieces 12, 32 during superplastic forming, a die can alternatively be used to exert the forces necessary for forming or bonding. For example, U.S. Pat. No. 6,612,020 to Sanders, the entirety of which is incorporated herein by reference, describes such a superplastic forming operation in which a die is used to exert the forming force.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a stop-off material on a workpiece, the method comprising:
    providing a tape having indicia defining a pattern on a first workpiece, the tape including a substrate and an adhesive for securing the substrate to the workpiece, such that a first portion of the workpiece is exposed and a second portion of the workpiece is covered by the tape, said providing the tape comprising disposing the tape on the workpiece, cutting the tape as defined by the pattern to define first and second portions of the tape, and removing the first portion of the tape and thereby exposing the first portion of the workpiece;
    disposing a stop-off material on the first portion of the workpiece while the second portion of the tape covers the second portion of the workpiece; and
    removing the tape from the workpiece such that the second portion of the workpiece is exposed substantially free of debris.

2. A method according to claim 1 wherein said cutting step comprises, subsequent to said disposing step, directing a source of laser radiation toward the tape and the workpiece and cutting the tape with the laser radiation while the tape is disposed on the workpiece.

3. A method according to claim 2 wherein said cutting step comprises automatically controlling the source of laser radiation through a predetermined motion to cut the tape according to a predetermined configuration.

4. A method according to claim 1 wherein said disposing step comprises spraying the stop-off material onto the first portion of the workpiece and at least part of the tape disposed on the workpiece.

5. A method according to claim 1 wherein said disposing step comprises disposing yttrium-oxide onto the first portion of the workpiece.

6. A method according to claim 1 further comprising providing the workpiece, the workpiece comprising titanium.

7. A method according to claim 1 wherein said removing step comprises removing the adhesive with the substrate.

8. A method according to claim 1 wherein said removing step comprises peeling the substrate of the tape from the workpiece and thereby removing the adhesive from the workpiece.

9. A method according to claim 1 further comprising diffusion bonding the second portion of the workpiece, the stop-off material on the first portion of the workpiece preventing diffusion bonding of the first portion of the workpiece.

10. A method according to claim 9 wherein said diffusion bonding step is performed after said removing step and without cleaning of the second portion of the workpiece between said removing step and said diffusion bonding step.

11. A method according to claim 1 further comprising diffusion bonding the second portion of the first workpiece to a second workpiece and superplastically forming at least one of the workpieces such that the workpieces define at least one expanded cell therebetween coincident with the first portion of the first workpiece.

12. A method for diffusion bonding a workpiece, the method comprising:
    providing a tape having indicia defining a pattern on a first workpiece such that a first portion of the workpiece is exposed and a second portion of the workpiece is covered by the tape, the tape including a substrate and an adhesive for securing the substrate to the workpiece, said providing a tape comprising disposing the tape on the first and second portions of the workpiece, cutting the tape as defined by the pattern to define first and second portions of the tape by directing a source of laser radiation toward the tape and the workpiece and cutting the tape with the laser radiation while the tape is disposed on the workpiece and removing the first portion of the tape from the first portion of the workpiece such that the second portion of the tape covers the second portion of the workpiece;
    disposing a stop-off material on the first portion of the workpiece;
    removing the substrate of the tape with the adhesive from the second portion of the workpiece such that the second portion of the workpiece is exposed substantially free of debris;
    providing a second workpiece in contact with at least part of the first and second portions of the first workpiece; and
    heating the first and second workpieces to a diffusion bonding temperature of the workpieces, urging the first and second workpieces together, and thereby diffusion bonding the second portion of the first workpiece and the second workpiece, the stop-off material on the first portion of the first workpiece substantially preventing diffusion bonding of the first portion to the second workpiece, said diffusion bonding step being performed after said second removing step and without cleaning of the second portion of the workpiece between said removing step and said diffusion bonding of the workpieces.

13. A method according to claim 12 wherein said cutting step comprises automatically controlling the source of laser radiation through a predetermined motion to cut the tape according to a predetermined configuration.

14. A method according to claim 12 wherein said disposing step comprises spraying the stop-off material onto the first portion of the workpiece and at least part of the tape disposed on the second portion of the workpiece.

15. A method according to claim 12 wherein said disposing step comprises disposing yttrium-oxide onto the first portion of the workpiece.

16. A method according to claim 12 further comprising providing the workpiece, the workpiece comprising titanium.

17. A method according to claim 12 wherein removing step comprises peeling the substrate of the tape from the workpiece and thereby removing the adhesive from the workpiece.

18. A method according to claim 12 further comprising superplastically forming at least one of the workpieces such that the workpieces define at least one expanded cell therebetween coincident with the first portion of the first workpiece.

19. A method for diffusion bonding a workpiece, the method comprising:

providing a tape on a first workpiece, the tape including a substrate and an adhesive for securing the substrate to the workpiece, said providing the tape on the first workpiece comprising providing the tape having indicia defining a pattern;

cutting the tape to define first and second portions of the tape, said cutting the tape comprising cutting the tape as defined by the pattern;

removing the first portion of the tape and thereby exposing a first portion of the workpiece such that the second portion of the tape covers a second portion of the workpiece;

disposing a stop-off material on the first portion of the workpiece and at least part of the tape disposed on the second portion of the workpiece;

removing the substrate of the tape with the adhesive from the second portion of the workpiece such that the second portion of the workpiece is exposed substantially free of debris;

providing a second workpiece in contact with at least part of the first and second portions of the first workpiece; and heating the first and second workpieces to a diffusion bonding temperature of the workpieces, urging the first and second workpieces together, and thereby diffusion bonding the second portion of the first workpiece and the second workpiece, the stop-off material on the first portion of the first workpiece substantially preventing diffusion bonding of the first portion to the second workpiece, said diffusion bonding step being performed after said second removing step and without cleaning of the second portion of the workpiece between said removing step and said diffusion bonding of the workpieces.

20. A method according to claim 19 wherein said cutting step comprises directing a source of laser radiation toward the tape and the workpiece and cutting the tape with the laser radiation while the tape is disposed on the workpiece.

21. A method according to claim 20 wherein said cutting step comprises automatically controlling the source of laser radiation through a predetermined motion to cut the tape according to a predetermined configuration.

22. A method according to claim 19 wherein said removing step comprises removing the adhesive with the substrate.

23. A method according to claim 19 wherein said removing step comprises peeling the substrate of the tape from the workpiece and thereby removing the adhesive from the workpiece.

* * * * *

UNITED STATES PATENT AND TRADEMARK OFFICE
CERTIFICATE OF CORRECTION

| | |
|---|---|
| PATENT NO. | : 7,653,978 B2 |
| APPLICATION NO. | : 10/884743 |
| DATED | : February 2, 2010 |
| INVENTOR(S) | : Arnold et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 756 days.

Signed and Sealed this

Twenty-third Day of November, 2010

David J. Kappos
*Director of the United States Patent and Trademark Office*